Nov. 3, 1942.   H. F. DALPAYRAT   2,301,022
ELECTROCHEMICAL GENERATION OF ELECTRICITY
Filed Jan. 21, 1941
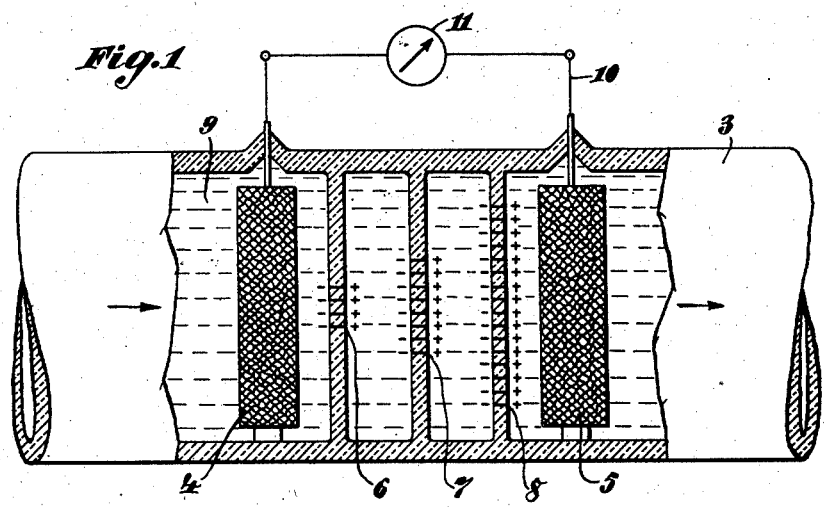
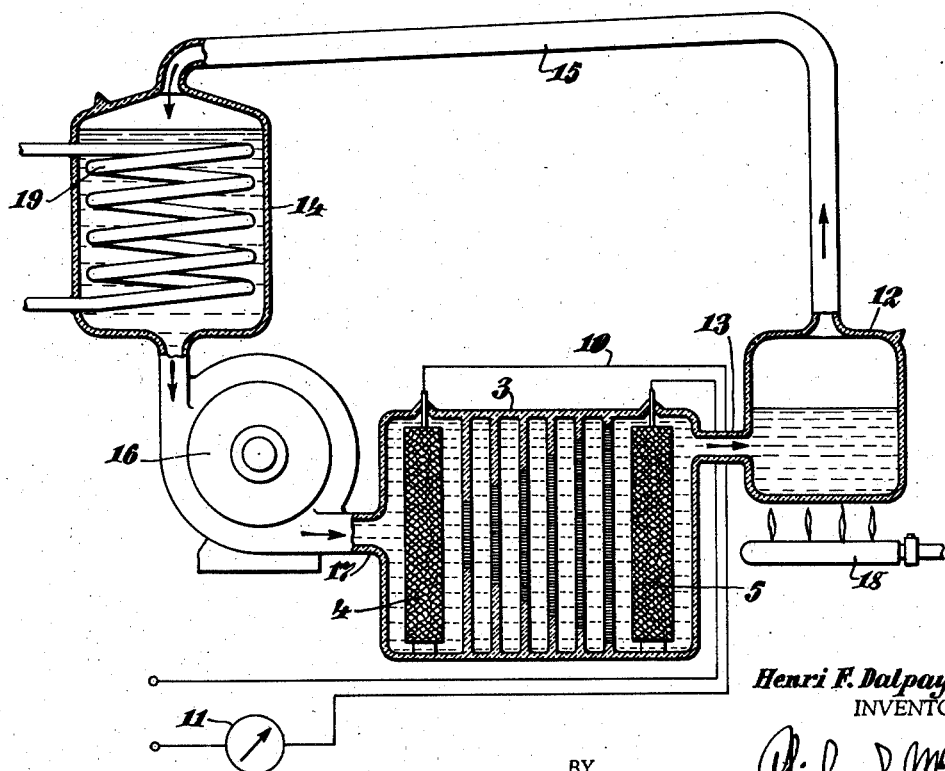
Henri F. Dalpayrat,
INVENTOR.
BY
ATTORNEY.

Patented Nov. 3, 1942

2,301,022

UNITED STATES PATENT OFFICE 2,301,022

ELECTROCHEMICAL GENERATION OF ELECTRICITY

Henri F. Dalpayrat, New York, N. Y.

Application January 21, 1941, Serial No. 375,205

6 Claims. (Cl. 136—83)

This invention relates to the generation of electric current and involves certain improvements over the principles disclosed in copending patent application Ser. 339,063 filed June 6, 1940.

The present invention involves the same method and means disclosed in the application referred to of forcing a conducting electrolyte through porous partitions of insulating material.

Objects of the present invention primarily are to increase the efficiency of the apparatus and the process without increasing the pressure applied to the electrolyte or otherwise complicating the system.

Also, it is the purpose of this invention to accomplish the generation or storage of larger amounts of electrical energy, such as becomes possible by neutralization of mutual attraction of certain double ionic layers through the novel method and means hereinafter set forth.

It is known that when a conducting electrolyte is forced through an insulating porous partition, the electric current generated and obtained at conducting electrodes in the solution at each side of the partition, is limited by the mutual attraction existing between the smaller ions of one polarity, infiltrated within the pores of the partition, and the larger ions of the opposite polarity which are accumulated in, and/or, near the intake surface of the partition.

A special object of the present invention is to neutralize this undesirable attraction of the double ionic layers.

This is accomplished under the invention by generating simultaneously in different areas of the solution, a number of differently polarized ionic concentrations of unequal electrical intensities and having their polarities cooperating to provide a greater freedom of motion for the oppositely charged ions which are separated through the method and means herein disclosed.

In the drawing accompanying and forming part of the following specification, the broad principle and one specific embodiment of the invention are illustrated. It is to be understood however, that many modifications and changes may be made, all within the true spirit and broad scope of the invention as hereinafter defined and broadly claimed.

Fig. 1 is a broken sectional and diagrammatic view illustrating the principles involved in the invention.

Fig. 2 is a broken sectional illustration of apparatus embodying a practical application of the invention.

Broadly, the invention comprises a vessel of electrically insulating material having a number of chambers connected by suitable conduits and containing a conducting electrolyte. A mechanically operated glass pump forces the electrolyte in contact with similar conducting electrodes and through insulating porous partitions in a generator cell portion of the apparatus. A heated solution chamber effects liberation of electrically neutral vapors near the solution output of the generator cell. These vapors are condensed in a cooled solution chamber and carried back in liquid form into the solution input of the generator cell by the pump. Thus the system is made to operate mechanically in a complete cycle, utilizing the same solution over and over again, without deteriorating the electrodes.

Referring in detail to the drawing and particularly to Fig. 1, the numeral 3, designates a glass vessel containing electrodes 4 and 5, separated by a series of partitions 6, 7, 8, of porous glass.

The electrolytic solution 9, is forced under pressure through to the porous partitions in the diection of the arrows, establishing a flow of electrons in the external conductive circuit 10, which may include a measuring instrument 11.

The porous partitions 6, 7 and 8, have different physical dimensions or different numbers of pores or pores of different diameters or lengths and they are shown related in a progressively increasing numerical order. The purpose of this arrangement is to provide the intake infiltration surface of each porous partition with a polarized electrolyte indicated as layers of negative and positive signs, having an electrical field greater than the field existing near the intake surface of each preceding partition. The fields of electrical attractions thus created propel ions of one polarity toward the input of the filter and facilitate the transfer of ions of the opposite polarity toward the output of such filter.

In Fig. 2, a complete cyclic system is indicated, in which the vessel includes a vaporization chamber 12, connected at 13, with the output side of the filter and a condensing chamber 14, connected at 15, with the vaporizing chamber and connected through the rotary glass pump 16, and conduit 17, with the input end of the filter.

The vaporizing chamber is shown as heated by a burner 18, which may be of constant or variable intensity according to requirements and condensation and cooling is shown as effected in the condensing chamber by a cooling coil 19.

The cooled solution and the condensed vapors in the condenser are forced by the pump 16, through conduit 17, into and through the generator cell 3.

The electrodes 4 and 5 are such as not to combine with the electrolytic solution. They may for instance, both be made of carbon, tungsten, tantalum, or the like.

When the cooled electrolyte is forced by the pump through the porous partitions 6, 7, 8, an excess of the smallest ions contained in the solution, will infiltrate and effuse out of the partitions, creating an accumulation of ions in the solution immediately in contact with the electrodes 4, 5, which become charged electrically. The different potentials generated simultaneously across the partitions propel and cooperate in transferring the smaller ions toward electrode 5, and attract the large ions of opposite polarity toward electrode 4.

A special advantage of the system illustrated is that the solution circulating through the generator cell being cold, may be contentrated or, if an acid, may contain a larger amount of dissolved gas ions.

The filter assembly of porous glass partitions in the relation disclosed eliminates the undesirable attractions of the double ionic layers. The distillation system interposed between the solution output and the solution input of the generator cell insures isolation of the electrical charges developed and assists in forming polarized concentrations cumulatively, such effect enabling storing of relatively large ionic charges in the electrode chambers.

By way of practical example, a small electrical output can be obtained with a single porous glass disc 2 millimeters thick having a porous area half an inch in diameter. By forcing a hydrochloric solution through the disc at pressures of 15 to 45 lbs., potentials of of .5 to 1.5 volts can be generated and currents of 2 to 8 milliamperes can be measured indicating that the output in milliwatts for this example, is proportional to the square of the pressure applied to the solution.

Under equal conditions of pressure, temperature and concentration of a given solution, it appears that greater currents are produced inversely proportional to decrease in thickness of the porous partition used and directly proportional to increases in the area of the porous surface. Higher potentials have been observed using partitions having fine pores or on increasing the concentration of the solution or on employing solutions containing ions carrying higher electronic valence such as potassium permanganate and still further increases in both potential and current values have been obtained by employing partitions closely assembled in parallel relation according to their varying number of pores as illustrated figuratively by the numerical progression 10, 20, 40, 80, 160, 320, etc.

What is claimed is:

1. The method of generating electricity, which comprises forcing a liquid electrolyte through a sequence of porous insulating partitions of different porosity interposed between electrodes connected in an external conductive circuit.

2. The method of generating electricity, which comprises forcing a liquid electrolyte through porous insulating partitions of different porosity interposed between electrodes connected in an external conductive circuit, and vaporizing, condensing and returning the electrolyte in a closed circuit.

3. Apparatus for generating electric current, comprising a filter composed of a series of porous insulating partitions of different porosity, electrodes at opposite sides of said partitions and means for forcing a liquid electrolyte through said filter.

4. Apparatus for generating electric current, comprising a filter of porous insulating partitions of different porosity, electrodes at opposite sides of said partitions, means for forcing a liquid electrolyte through said filter, means for vaporizing the electrolyte at the output side of the filter and means for condensing and returning the electrolyte as a liquid to the input side of the filter.

5. The structure of claim 3, in which the partitions are of progressively increasing porosity toward the output side of the filter.

6. The method of claim 1, in which the partitions are of increasingly greater porosity in the direction of flow of the electrolyte.

HENRI F. DALPAYRAT.